April 15, 1969     O. SPIEHS     3,438,643
SKI BOBSLED
Filed April 17, 1967     Sheet 1 of 3
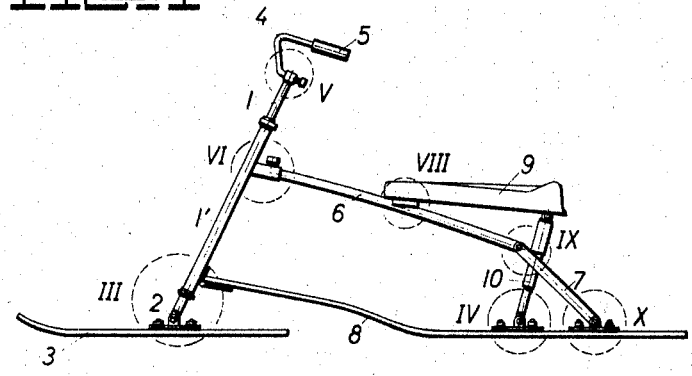
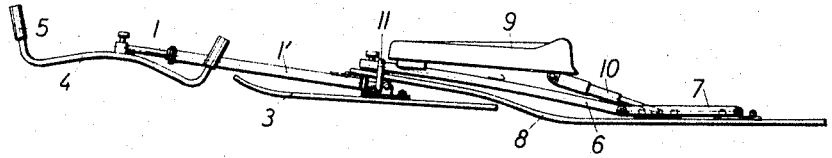
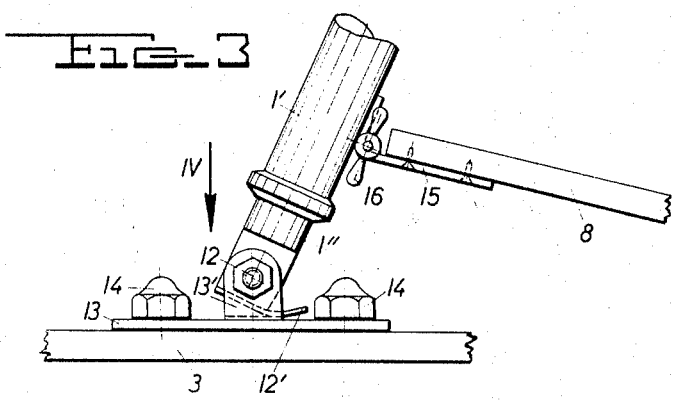

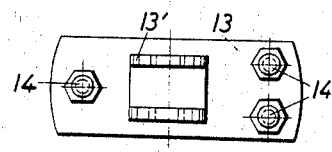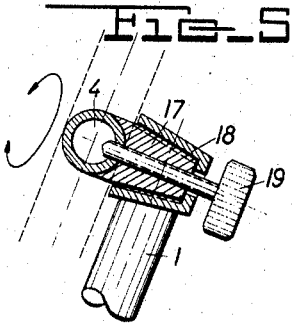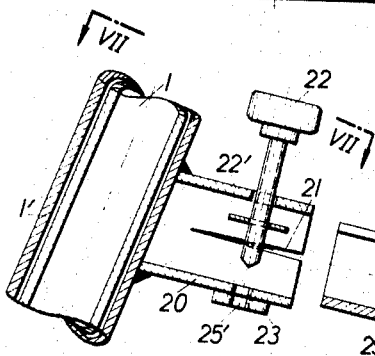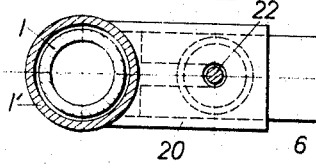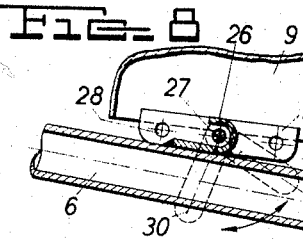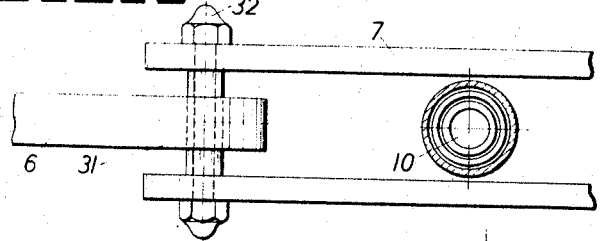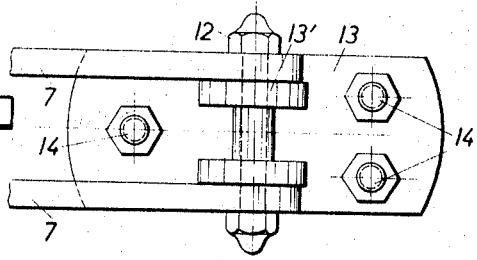

United States Patent Office 3,438,643
Patented Apr. 15, 1969

3,438,643
SKI BOBSLED
Oswald Spiehs, 46 Rechte Nordbahnstrasse,
Vienna 21, Austria
Filed Apr. 17, 1967, Ser. No. 631,448
Claims priority, application Austria, Apr. 18, 1966,
A 3,616/66; Mar. 23, 1967, A 2,863/67
Int. Cl. B62b 13/00, 9/04, 17/02
U.S. Cl. 280—16     12 Claims

ABSTRACT OF THE DISCLOSURE

Ski bobsled having a framework resembling that of a bicycle, and two aligned gliding skids, the front skid being laterally swingable by way of a steering column. There are provisions to fold or knock down the structure to a flat unit which occupies a limited space for transportation. The front end of the lower frame portion can be swiveled with respect to the front frame portion, in the plane of the frame, about a substantially horizontal axis. An upper strut portion of the frame is articulated in the region of the driver's seat and is supported above the rear gliding skid from a spot which is more rearwardly than another spot where a resilient support is attached for the seat.

---

The invention relates to a ski bobsled with a bicycle-type framework, a steering column, a driver's seat, and suitable articulations and connections between the framework and two substantially aligned gliding skids.

More particularly, the invention relates to a ski bobsled having its steering column supported by the front gliding skid, the driver's seat resting on the strut which forms the upper portion of the frame and is attached to the steering column. The seat is supported, together with the rear end of the strut, by the rear gliding skid, there being a pivotal connection between the end of the lower frame portion protruding above the gliding surface and the front frame portion.

In such ski bobsleds the lower frame portion is usually constituted by the rear gliding skid itself, the front end of the skid reaching up for attachment to the front portion of the frame. The latter can consist of the steering column proper; it is however also possible to provide a front frame portion which is parallel with but separate from the steering column, and pivotally connected thereto.

In previously known ski bobsleds of the above kind there is a pivotal connection between the lower frame portion and the steering column but the axis of the pivot is usually parallel to the column; thus, it is substantially vertical. In the direction of the gliding surface, this connection naturally does not provide too much elasticity so that the spring action in a direction perpendicular to the gliding surface is rather limited, and the connection is of course prone to breakage owing to the continuous load or stress applied thereto.

It is the object of the present invention to provide a connection between the lower frame portion, thus preferably the connection of the rear gliding skid which constitutes the lower frame portion, with the steering column, for instance, in a manner so that this lower frame portion is allowed to yield resiliently in the plane of the frame, that is, in a plane perpendicular to the gliding surface. Furthermore, provisions should be made to allow the entire ski bobsled to be folded or knocked down into a flat, elongated unit.

In accordance with a major, important feature of the present invention, the front end of the lower frame portion is connected with the front frame portion by a horizontal axis, in a manner pivotable in the plane of the frame. With this connection, the ski bobsled is given an extraordinary high resilience, and it is therefore better suited to absorb intermittent or vibratory shocks than previously known ski bobsleds having a frame which is substantially rigid in its own plane.

According to another important characteristic of the invention, the front end of the strut is attached to the front frame portion in a releasable manner so that the steering column and the strut can be folded in the plane of the two gliding skids, upon release of the aforementioned connection. The lower frame portion can also be swiveled about the pivotal connection, with the front portion of the frame, and the ski bobsled can thus be folded or knocked down to an elongated unit which can be carried as a pair of skis.

According to another important inventive feature, a resilient member is disposed between the underside of the frame and the upper side of the rear part of the front gliding skid, which tends to keep or hold the front gliding skid at least approximately in the gliding plane which is also the plane of the frame. This resilient member will thus attempt to turn back the gliding skid with the steering column, and to restore their position, upon pivotal movement of the column, which position corresponds to the straightforward movement or course of the ski bobsled. The more the steering column is turned in, the greater will be the spring action which tends to turn back the column into the initial position. Furthermore, the same resilient member serves to stabilize the front gliding skid in a particular pivotal position with respect to the steering column.

Finally, it is also provided, according to yet a further inventive feature, that the strut has a pivotal or articulated subdivision in the range of the driver's seat, and is supported indirectly by way of a pair of supports pivotally attached to its rear end, against a spot on the rear gliding skid, which is farther back than the spot at which a resilient support is pivotally connected on the same rear gliding skid for the driver's seat. By this expedient it is achieved that the percussive powers acting upon the rear skid are imparted to the strut and the seat resting thereon only to a lessened degree, by way of the supports pivotally connected with the strut.

The forces imparted to the driver's seat influence the rear gliding skid by way of a transversely arranged spring system of the seat, in the sense of a forward movement. This articulation of the strut is most advantageous with respect to the capability of the ski bobsled frame to withstand intermittent loads and stresses.

In the following, two preferred exemplary embodiments of the inventive ski bobsled will be described in full detail; it should be understood, however, that these embodiments are described by way of examples and not of limitations. In the accompanying drawings, FIG. 1 is a side-elevational view of a first embodiment of the inventive ski bobsled, in assembled and erected condition, ready for use;

FIG. 2 is a side view of the ski bobsled of FIG. 1 in knocked-down or folded condition;

FIGS. 3 to 6 are respective enlarged views taken from FIG. 1, corresponding to the respective areas encircled in broken lines and identified by numerals III to VI, FIG. 4 being a top view while the others are (partly sectional) side views;

FIG. 7 is a partly sectional top view taken along line VII—VII of FIG. 6;

FIGS. 8 to 10 are again enlarged partial views taken from FIG. 1, and corresponding to the areas respectively identified by VIII to X, FIG. 8 being a side view while the others are top views;

FIG. 11 is a side-elevational view, similar to that of

Figure 11:
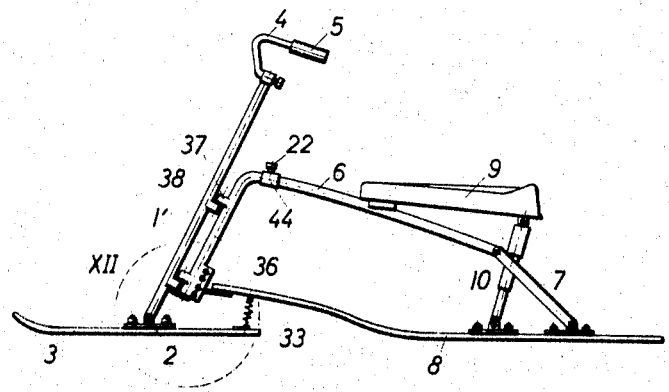
Figure 12:
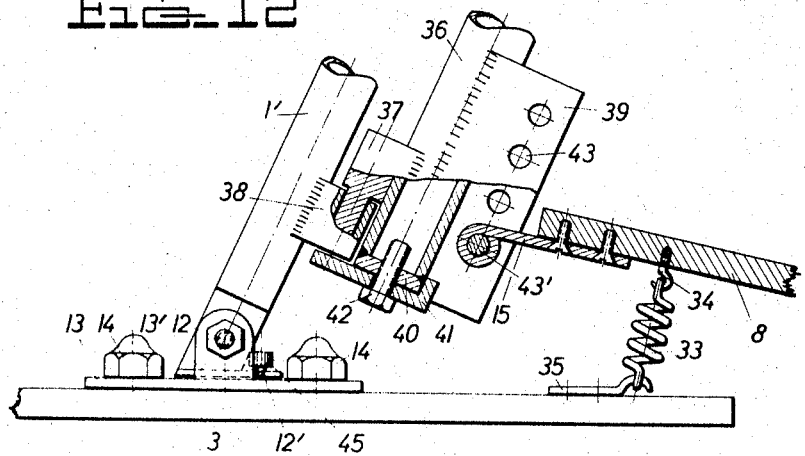
Figure 13:
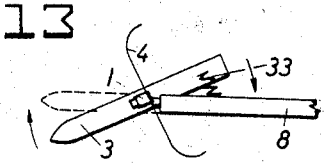

FIG. 1, of a somewhat modified, second embodiment of the inventive ski bobsled;

FIG. 12 is a partly sectional side view of a portion of FIG. 11, on an enlarged scale, and corresponding to the elements in the dotted circle II; and FIG. 13 is a somewhat schematic top view of the front portion of the ski bobsled according to FIGS. 11 and 12, on a reduced scale.

The first embodiment of the ski bobsled will now be described with reference to FIGS. 1 and 2, as well as the enlarged detail views of FIGS. 3 to 10. As shown in FIG. 1, a steering column 1 is supported, in the area III encircled with a broken line, by a hinge 2 in the top surface of a front gliding skid 3, and it carries at its upper end, in the area V, a releasably attached steering arm 4 with handles 5.

The steering column 1 is similar in its structure to those used in bicycles, and it may conventionally include a non-rotatable part 1' (outer tube) as well as inner tubes 1 and 1", and appropriate ball bearings which are disposed in a known manner at the respective upper and lower ends of the non-rotating part 1'. The latter is connected with a strut or upper frame portion 6 and with a rear gliding skid 8, these two elements constituting portions of a frame or framework together with a rear frame portion or supports 7. All these parts will be explained in detail as the description proceeds.

In the area VI of FIG. 1, similarly denoted by a broken circle, the non-rotatable part 1' of the steering column 1 is releasably secured to the strut 6. The rear end of this strut is supported by a pair of supports 7 constituting the rear frame portion and held above the rear gliding skid 8. The supports 7 have articulated connections both with the strut 6, as shown in area IX, as well as with the rear skid 8, in area X.

In the area VIII, a driver's seat or saddle 9 is supported by the strut 6, the seat having preferably a construction similar to those of small motor bicycles. The rear end of the seat 9 rests on a support 10 in the shape of a shock absorber, including a telescope-type spring assembly. This support has its upper end connected with the seat 9 and its lower end articulated to the rear skid 8, in area IV. The upper end of the seat is rearwardly inclined.

It is important that the strut 6 is held above the supports 7 against a spot of the rear gliding skid 8 which is more rearwardly than another spot at which the support 10 is connected for holding the seat 9. This two-spot articulation or connection of the ski bobsled on the rear gliding skid 8, in combination with the articulated subdivision of the strut 6, lends extraordinary resiliency to the ski bobsled.

For folding or knocking down the ski bobsled into the position shown in FIG. 2, the connection of the strut 6 with the steering column 1 (actually the non-rotating part 1' thereof) is disconnected at VI (as will be described somewhat later) and all parts, including the column 1 with the arm 4, the strut 6, with the seat 9, the rear support 10 of the latter and the supports 7, are all tilted forwardly onto the front skid 3.

FIG. 8 shows that the connection of the seat 9 with the strut 6 is so designed that the seat is locked in the anchoring of strut 6 only in the operational position shown in FIG. 1; otherwise it is free to slide forward with its locking means after it became detached therefrom, for purposes of knocking down the ski bobsled. A band 11 can be provided to hold together the bobsled in its folded condition, as shown in FIG. 2.

FIG. 3 is the first one of the enlarged detail views, illustrating a jointed bolt 12 which is part of the structure shown within the circle III of FIG. 3, where the steering column 1 is connected, with its lowermost inner tube 1", to the front gliding skid 3 by way of a square connecting member.

The lower part of the inner tube 1" and the square connecting member forming this end is provided with a stop 12' which prevents the front skid 3 from being swung too far with respect to the steering column 1. This prevents accidents when using the ski bobsled on a sloping terrain.

The articulated connection of the steering column 1 with the front skid 3 is accomplished by way of a fitting plate 13, attached to the skid 3 by means of cap nuts 14. Similar plates 13 are used in areas IV and X; in the former, the support 10 of the seat 9 is linked to the rear skid 8, and this is shown in FIG. 4 which is taken in the direction of arrow IV, as shown in FIG. 3. FIG. 10 shows the other fitting plate 13, in the area X of FIG. 1, where the supports 7 of the strut 6 are connected with the rear skid 8. The plates 13 have upwardly extending cheeks 13' for journaling the articulations constituted by the respective joint bolts 12.

FIG. 3 also shows how the front end of the rear skid 8 is connected in a pivotal or swivelling manner in the area of the lower end of the non-rotating part 1' of the steering column 1, by way of a hinge 15. The bolt of this hinge is in the form of a threaded bolt which is fitted with a wing nut 16 so that it can be removed, if necessary, and the articulation disconnected. This may become necessary if the ski bobsled is taken apart for repair, cleaning or storage in a small space.

FIG. 5 is a sectional view of the connection between the steering arm 4 and the upper end of the column 1. The arm 4 has an upwardly directed extension 17 which is in the form of a conical member having serrations or teeth on its outer surface; this member can be inserted in a recess 18 at the upper end of the steering column 1, which is similarly of conical shape and has corresponding serrations or teeth. A screw 19 is provided for immobilizing the extension 17 in any desired rotational position within the recess 18.

It will be understood by those skilled in the art that the extension 17 may be attached and secured so that the steering arm 4 is transverse to the longitudinal direction of the column 1, the handles 5 pointing upwardly or downwardly, as desired. It is however possible to insert and secure the arm 4 so that it runs substantially in the same direction as the column 1, and this is used when the ski bobsled is folded as in FIG. 2, so as to take up a limited space.

FIGS. 6 and 7 show a portion of the steering column 1 with its inner tube and with an extension 20 protruding towards the rear, and adapted to hold the front end of the strut 6. The extension 20 has a slot 21 so that it can be pushed over the front end of the strut 6 and secured thereat by way of a clamping screw 22. This screw traverses the extension 20 and is secured against inadvertent removal or falling out by means of a washer 22'. The screw 22 can be attached to an inner thread 23 provided in a plate at the underside of the extension 20.

The strut 6 has a slot 24 on its top, and a bore 25 at the bottom for the shank of the screw 22. Consequently, the screw does not have to be removed when inserting the strut 6 into the extension 20, it only has to be pulled up a little when the strut is inserted, and it can then be passed through aligned bores 25 and 25', the latter being in the plate attached to the underside of the extension 20.

The detail shown in FIG. 8 relates to the swivel connection of the seat 9 on the strut 6, as shown in FIG. 1 in the region VIII. To this end, the strut is provided with a hook 26 open toward the front and serving as an anchoring means for receiving a bolt 27 or similar member disposed in the region at the front end of the seat 9. This connection is released simply by moving the seat 9 along the strut 6, toward the front end, when the ski bobsled is closed, and this can be seen in FIG. 2.

The bolt 27 is the shank of a threaded bolt which is guided through aligned openings or bores 28 of two parallel cheeks 29 which are secured to the seat 9 and protrude downwardly. By means of these cheeks 29 and the threaded bolt 27, the latter being easily pivoted by means of a toggle 30, it is possible to hold the hook of the strut 6 from both sides in order to clamp the seat 9 onto this hook. This clamping can be released by a single movement when the ski bobsled is to be folded. There are three pairs of openings 28 in the cheeks 29, as shown in FIG. 8, allowing the attachment of the anchoring bolt 27 more forwardly or more rearwardly with respect to the seat 9.

FIG. 9 is a top view of the rear end of the strut 6 to which the supports 7 are attached on either side by way of a screw bolt 31 and with cap nuts 32. The supports 7 are spaced apart a sufficient distance so that they can be folded onto the upwardly protruding flanges of the fitting plate 13' in the region VI, where they straddle the cheeks 13' from both sides, in order to rest on the top of the rear skid 8, as shown in FIG. 2.

FIG. 9 also shows the seat support 10 in cross section; in a conventional manner, it consists of a telescope-type tube including a spring, as well as of a shock absorber as used in motor bicycles.

Finally, FIG. 10 shows the articulation with appears in FIG. 1 within the circle X, at the lower ends of the supports 7 on top of the fitting plate 13, at the rear end of the rear skid 8. The structure of this articulation and of the fitting plate 13 is substantially identical to that used in regions III and IV, described before in detail.

FIGS. 11 to 13 relate to a somewhat modified, second embodiment of the ski bobsled. FIG. 11 is similar to FIG. 1, and it shows several identical elements which have been described before, such as parts 1 to 10 and 22; other elements, forming part of the first embodiment, have not been shown again for the second, but it will be understood that they also form part thereof, these being the elements 1', 1'', 12, 12', 13, 13', 14, 17 to 19 and 26 to 32. Only the different and new elements will be described hereunder. FIG. 12 constitutes an enlarged detailed view of FIG. 11, taken within the broken-line circle XII.

The second embodiment is distinguished from the first one particularly by the provision of a front frame portion 36 which is linked to the steering column 1 by means of connecting members 37, similar to door hinge plates, and allowing a pivotal or swivelling action between the connecting elements. Corresponding connecting members 38 are provided on the column 1.

Undesired releasing of these connecting members is prevented by a releasable locking mechanism which includes a pivotable plate 41 journaled on the underside of the front frame portion 36, which can be arrested in its pivoted position. The plate 41 is secured to the front end 40 of the frame portion 36, constituted by a tube, by means of a bolt 42 or like member. The pivotable plate 41 can be moved with one of its parts into the axis of the connecting members 37, 38, between the steering column 1 and the front frame portion 36, so as to prevent an axial movement of these elements with respect to one another, when in the position as shown in FIG. 2.

A sleeve or similar member 44, having a rearwardly directed recess, is provided on the front frame portion 36 so as to allow releasable connection with the front part of the strut 6. This end can be releasably attached to and anchored in this recess, for example, by simply pushing in and securing with a screw 22 (similar to that shown in FIGS. 6 and 7 for the same purpose).

The front end of the rear skid 8 has to be attachable at different levels on the front frame portion 36. To this end, the latter has on its side facing the skid 8 a flange-like extension 39 provided with bores 43 at different levels. Into these bores, a joint bolt 43' can be selectively introduced, which serves as a swivel axis for journaling the upwardly bent front end of the rear skid 8, the bolt 43' being embraced by the appropriately bent forward end of a hinge member 15 (similar to that shown in and described with reference to FIG. 3). By this arangement, the front end of the rear skid 8 can be attached at different elevations to the flange-like extension 39 of the front frame portion 36.

FIG. 12 also shows that the forward underside of the rear skid 8 has attached thereto a tension spring 33, in the form of a coil spring, by way of a hook 34. The other end of the spring 33 is attached rearwardly to the front skid 3 by way of a hook 35 from which it can be readily detached; the spring is at least approximately perpendicular to the gliding surface of the skid 3. If the steering column 1 with the skid 3 is laterally swivelled, the spring 33 is tensioned and tends to return the skid 3 into its original position, that is, into the plane of the frame. FIG. 13 shows the action of this spring in a somewhat schematic top view, illustrating the respective angularly displaced positions of the front and rear skids 3 and 8.

The spring 33 not only serves to return the steering column 1 and the arm 4, but it is also effective to stabilize the front skid 3 in the lengthwise aligned position in which it corresponds to and forms a continuation of the gliding surface of the rear skid 8, as shown in FIGS. 1 or 11.

The second embodiment of FIGS. 11 to 13 also has a stop 12' provided at the lower end of the steering column 1, which prevents the skid 3 from pivoting or swivelling too close to the underside of the skid 8. An adjusting screw 45 allows a stop to be set in any desired position for limiting the movement of the front skid 3, as shown in FIG. 12.

It will be understood that those elements of the second embodiment which have not been described in particular are identical with or similar to those of the first embodiment, shown in FIGS. 1 to 10.

What is claimed is:

1. A ski bobsled comprising, in combination, a framework having upper and lower portions substantially disposed in a plane, steering means removably attached to the upper portion of said framework, a seat at least partly releasably attached to the upper portion of said framework, gliding means including a front and a rear skid in substantial operational alignment, pivot means connecting said steering means with said front skid, said upper portion of the framework and said seat being articulated to said rear skid, and pivotal connecting means between said steering means and the lower frame portion to provide relative pivotal movement therebetween about a horizontal axis which is transverse of said plane of the framework, said lower portion of the framework being integral with said rear skid and constituted by the front portion thereof.

2. The ski bobsled as defined in claim 1, wherein said upper portion of the framework and said seat are articulated to the rear such that with the upper portion of the framework released from the steering means, the steering means can be folded downwardly onto the front skid while the framework is collapsed.

3. The ski bobsled as defined in claim 1, further comprising a support forming part of said top portion of the framework and articulated thereto underneath said seat, said support being articulated to said rear skid at a location which is more rearwardly than the location at which said seat is supported from said rear skid.

4. The ski bobsled as defined in claim 3, further comprising a shock-absorber type support attached close to the rear end of said seat and tilted rearwardly as it extends from said rear skid toward said seat.

5. The ski bobsled as defined in claim 2, further comprising a releasable attachment between said top portion of the framework and said seat, including a forwardly open hook secured to said top portion and a transverse bolt attached to said seat for engagement with said hook in the operative position of the ski bobsled.

6. The ski bobsled as defined in claim 2, wherein said steering means includes a steering column, a steering arm and means for releasably interconnecting said arm with said column, including an extension on and substantially perpendicular to said arm, while said column has a recess for receiving said extension, and means for immobilizing said arm with respect to said column in various relative positions, including those in which said arm is transversal to and in which it is parallel with said column.

7. The ski bobsled as defined in claim 2, wherein said steering means includes a steering column with an outer stationary tube and an inner rotatable part which is connected with said joint means, and further comprising releasable attaching means between the forward end of said top portion of the framework and said outer tube of the steering column.

8. The ski bobsled as defined in claim 1, further comprising releasable means for attaching the front end of said rear skid to a lower portion of said steering means.

9. The ski bobsled as defined in claim 1, wherein said framework includes a frontal member substantially parallel with said steering means, and further comprising means for varying the relative positions of said lower frame portion with respect to said frontal member in at least two increments.

10. The ski bobsled as defined in claim 9, further comprising releasable attaching means between the forward end of said top portion of the framework and an outer stationary portion of said steering means.

11. The ski bobsled as defined in claim 9, wherein said varying means includes a flange-like extension at the lower end of said frontal member, having at least two bores therethrough, and said lower frame portion has a hinge attached thereto, with a joint bolt being selectively insertable in one of said bores for varying the relative height of said lower frame portion above said front skid.

12. The ski bobsled as defined in claim 9, further comprising resilient means removably attached to the rear end of said front skid and said front part of said rear skid for holding said front skid at least approximately in the same plane as that of said framework and in the gliding plane of said rear skid.

References Cited

UNITED STATES PATENTS

| | | | |
|---|---|---|---|
| 1,462,889 | 7/1923 | Slater | 280—16 |
| 1,703,174 | 2/1929 | Roe | 280—287 X |
| 2,777,711 | 1/1957 | Yokomaki | 280—287 |
| 3,015,498 | 1/1962 | Tanaka et al. | 280—278 |
| 3,325,179 | 6/1967 | Bissett | 280—25 |
| 3,354,975 | 11/1967 | Stuart | 280—278 |

OTHER REFERENCES

Go Go Ski Advertisement, received in Patent Office Mar. 10, 1966.

BENJAMIN HERSH, *Primary Examiner.*

J. E. SIEGEL, *Assistant Examiner.*

U.S. Cl. X.R.

280—20, 287